Jan. 25, 1966  G. SCHAEFFLER  3,230,605

METHOD OF ASSEMBLING A ROLLER BEARING

Filed Nov. 29, 1963

INVENTOR
GEORG SCHAEFFLER
BY
ATTORNEYS

# United States Patent Office 3,230,605
Patented Jan. 25, 1966

3,230,605
METHOD OF ASSEMBLING A ROLLER BEARING
Georg Schaeffler, Herzogenaurach, near Nurnberg, Germany, assignor to Industriewerk Schaeffler, Herzogenaurach, Germany, a corporation of Germany
Filed Nov. 29, 1963, Ser. No. 326,679
Claims priority, application Germany, Dec. 13, 1962,
J 22,834
2 Claims. (Cl. 29—148.4)

The invention relates to a novel method of assembling a roller bearing consisting of a cylindrical race having at both ends a rim or flange extending radially toward the center and a plastic comb cage between said flanges for guiding the cylindrical rollers about the race.

Various roller cylindrical bearings are known but each has certain defects. One such embodiment is manufactured by first drawing from sheet metal a race having at one end a radial flange directed toward the center. The race is then hardened except for a strip at the end opposite the flange. After the comb cage is inserted on the race, the unhardened strip of the race is rolled to form a second flange to hold the cage in position. This embodiment has the disadvantages of having only one of the two flanges hardened and of being relatively complicated to manufacture because of the various successive steps required to make the race and is thus expensive.

Other bearings are known wherein the race either drawn from sheet metal or made without cutting and drawing is completely finished and hardened before the comb cage is inserted. In this type of bearing, however, there must be a slit or break in the support ring of the comb cage in order to insert the comb cage into the race. The slit allows the comb cage to be elastically deformed while being inserted into the race so that the two ends of the support ring of the comb cage overlap slightly to reduce the diameter of the comb cage. Since the individual spacer teeth of a comb cage are connected at only one end to a support ring, a comb cage inherently does not have the same rigidity as a window type cage in which the roller spacers are supported by a ring at both ends. Therefore, when a comb cage, especially if it is made of plastic, is constructed so that the single support ring has a slit or break in its circumference, its rigidity is even further reduced. Therefore, bearings with these type of cages have limited use in only certain fields.

It is an object of the invention to provide novel roller bearings which avoid the defects of prior art bearings.

It is another object to provide a novel process for assembling roller bearings.

These and other objects and advantages of the invention will become obvious from the following detailed description.

The roller bearing of the invention is comprised of a race having a wide radial flange adjacent to the open end of the comb cage against which the end surfaces of the roller element abut, and a radial flange at the opposite end of sufficient width that the comb cage may pass thereover and that has sufficient surface for axial abutment of the cage against it, a comb cage having a solid support ring and roller elements between the spacer teeth of the comb cage. Tests have shown that plastic comb cages can be made which are elastic enough to be snapped in place over the flange of a bearing race whose diameter is somewhat larger than the diameter of the comb cage.

The race with its flanges may be made by any of the known methods such as from a piece of sheet metal or from metal tubing or the like by metal cutting operation. If the operating conditions under which the bearing is to be used require it, the race can be hardened prior to the assembly of the bearing.

The method of the invention for assembling the roller bearing comprises inserting the lower edge of a plastic comb cage into position in a race having a radial flange opposite the open end of the comb cage having a radial width sufficient for the roller elements to abut against and a radial flange at the closed end of the comb cage having a radial width sufficient to pass the comb cage thereover and to axially abut the cage, the closed end of the comb cage being adjacent the latter radial flange, applying an axially directed force to the upper edge of the comb cage whereby the comb cage is temporarily deformed to pass under the latter radial flange and then resumes its normal shape when in position between the radial flanges and filling the spacer teeth of the comb cage with roller elements from the open end of the comb cage.

This method of assembly permits a substantial difference between the diameter of the comb cage and the radial flange over which the comb cage is passed and this difference in diameters provides a relatively large surface for axial abutment of the cage against the radial flange. The support ring of the comb cage during assembly is not in a plane parallel to the race but is inclined to the said plane until the last portion of the support ring has passed under the radial flange and the comb cage is in final position.

Referring now to the drawings.

Figure 1:
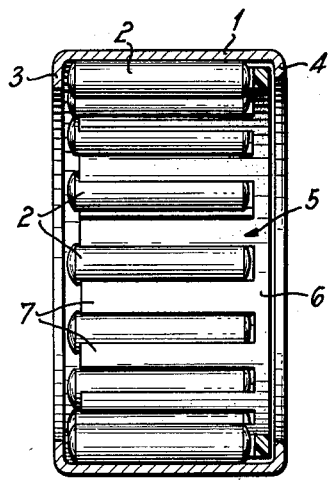
FIG. 1 is a longitudinal section through the assembled bearing.
Figure 2:
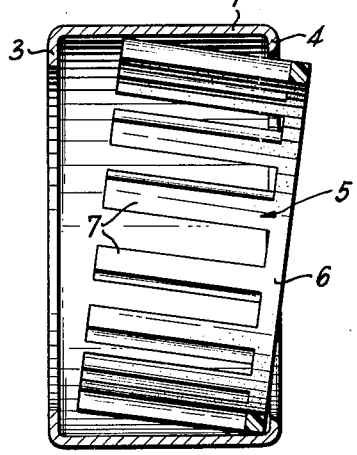
FIG. 2 is a longitudinal section through the bearing just before the comb cage is finally positioned.

In FIG. 1 and FIG. 2, the bearing consists of a race 1 having on its inner surface the running surface for the roller elements 2. The race 1 has at its ends rims or flanges 3 and 4 radially directed toward the center. The roller elements 2 are maintained parallel to the axis of the race 1 by teeth 7 of plastic comb cage 5 which receive the roller elements 2 between them and hold them at least radially toward the interior. The edges of the teeth 7 may be curved to match the curvature of the rollers 2. The support ring 6 of comb cage 5 abuts against flange 4. The essential characteristic of the bearing resides in that flange 3 of race 1 is sufficiently wide in a radial direction to allow roller elements 2 to abut axially against it while the radial width of flange 4 of race 1 is small enough to permit the comb cage 5 to be snapped into the race but high enough to provide sufficient surface for axial abutment of the support ring 6 of the cage 5 against the flange 4.

FIG. 2 shows the same bearing without roller elements 2 during assembly just before the comb cage 5 is snapped into place. The lower edge of support ring 6 of the comb cage 5 is seated behind flange 4 of the race 1 and need only be pushed at the upper edge by an axially directed force to pass under the flange 4 and snap into position in the race 1. When the axial force is applied at the upper edge, support ring 6 is deformed to a certain extent from its circular shape but since this deformation is within the elastic limits of the comb cage and the deformation is immediately redressed after the comb cage 6 is in final position the temporary deformation does not interfere with the proper operation of the bearing.

Various modifications of the bearings of the invention may be made without departing from the spirit or scope thereof and it is to be understood that the invention is to be limited only as defined in the appended claims.

I claim:

1. A method of assembling a roller bearing consisting of an outer race having radial inwardly directed flanges at each end thereof, a plastic comb cage with a solid support ring and axially extending spacer teeth, and roller elements arranged between the said spacer teeth, the method comprising inserting the lower edge of the comb cage into position in the race, its radial flange adjacent the open end of the comb cage having a radial width sufficient for the roller elements to abut against and its radial flange at the closed end of the comb cage having a radial width sufficient to pass the comb cage thereunder and to axially abut the cage, the closed end of the comb cage being adjacent the latter radial flange, applying an axially directed force to the upper edge of the comb cage whereby the comb cage is temporarily deformed to pass under the latter radial flange and then resumes its normal shape when in position between the radial flanges and filling the spacer teeth of the comb cage with roller elements from the open end of the comb cage.

2. The method of claim 1 wherein the race is hardened before assembly.

References Cited by the Examiner
UNITED STATES PATENTS

| | | | |
|---|---|---|---|
| 2,741,015 | 4/1956 | Young | 29—148.4 |
| 2,897,581 | 8/1959 | Cowles | 29—148.4 |
| 3,006,703 | 10/1961 | Bensch | 308—212 |
| 3,046,064 | 7/1962 | Schaeffler | 308—212 |

WHITMORE A. WILTZ, *Primary Examiner.*

FRANK SUSKO, THOMAS H. EAGER, *Examiners.*